(12) United States Patent
Mackey et al.

(10) Patent No.: US 10,926,494 B2
(45) Date of Patent: Feb. 23, 2021

(54) WINDSHIELD AND LAMINATED GLASS REPAIR TOOL

(71) Applicant: Glas-Weld Systems, Inc., Bend, OR (US)

(72) Inventors: Randy Mackey, Bend, OR (US); Seth Schuepbach, Bend, OR (US); Brad Plumb, Bend, OR (US); Shiloh Spoo, Bend, OR (US); Dominik Scheffler, Bend, OR (US)

( * ) Notice: Subject to any disclaimer, the term of this patent is extended or adjusted under 35 U.S.C. 154(b) by 0 days.

(21) Appl. No.: 15/526,989

(22) PCT Filed: Apr. 6, 2017

(86) PCT No.: PCT/US2017/026420
§ 371 (c)(1),
(2) Date: May 15, 2017

(87) PCT Pub. No.: WO2017/177049
PCT Pub. Date: Oct. 12, 2017

(65) Prior Publication Data
US 2019/0016071 A1 Jan. 17, 2019

Related U.S. Application Data

(60) Provisional application No. 62/390,728, filed on Apr. 6, 2016.

(51) Int. Cl.
*B29C 73/02* (2006.01)
*B32B 17/10* (2006.01)
*F16B 47/00* (2006.01)
*B29L 31/30* (2006.01)

(52) U.S. Cl.
CPC ...... *B29C 73/025* (2013.01); *B32B 17/10963* (2013.01); *F16B 47/00* (2013.01); *B29L 2031/3052* (2013.01)

(58) Field of Classification Search
CPC .................................................. B29C 73/025
See application file for complete search history.

(56) References Cited

U.S. PATENT DOCUMENTS 5,670,180 A * 9/1997 Mackey ................ B29C 73/025
264/36.21

FOREIGN PATENT DOCUMENTS

RU 2154576 C1 * 8/2000

* cited by examiner

*Primary Examiner* — Ryan M Ochylski
(74) *Attorney, Agent, or Firm* — Donn K. Harms

(57) ABSTRACT

A glass repair tool for injecting resin into defects in glass is provided, having a mount which is removably engageable to the glass and which is in a sliding ratcheted engagement with a resin injector. This ratcheted engagement allows translation of the injector quickly to a contact with the glass to position it for resin injection into the defect. Stretching suction cups and a compressible seal prevent excess force from being imparted to the glass during the contact of the injector with the glass.

18 Claims, 5 Drawing Sheets

WINDSHIELD AND LAMINATED GLASS REPAIR TOOL

This application claims priority to U.S. Provisional Patent Application Ser. No. 62/390,728 filed on Apr. 6, 2016, which is incorporated herein in its entirety by this reference thereto.

BACKGROUND OF THE INVENTION

1. Field of the Invention

The present invention relates generally to the repair of cracks formed in laminated glass products. More particularly, the invention relates to a glass-engageable mount which is configured for a sliding ratcheted engagement with a resin injector to operatively position the injector in compressed engagement with the glass for subsequent communicating of filler material to the underlying crack in the glass. The mount is employable with any appropriately configured injector.

2. Prior Art

Laminated glass consists generally of a plurality of layers of glass and one or more interlayers of a tough plastic material or resin. When laminated glass is impacted and broken, the glass layers are held in place by the resin interlayer between the two or more layers of glass. Thus, the interlayer maintains the layers of glass bonded, even when broken, and its toughening prevents the glass from breaking up into large sharp pieces.

Laminated glass is normally used when there is a possibility of human impact or where the glass could fall if shattered. Skylight glazing and automobile windshields typically use laminated glass. In geographical areas requiring hurricane-resistant construction, laminated glass is often used in exterior storefronts, curtain walls and windows.

Vehicle windshields are formed conventionally in this type of construction and are probably the most commonly known form of laminated glass. Hereafter, while the laminated glass may be referred to as a windshield for ease of description and convenience, such a reference will also apply to any type of glass having the laminated construction.

As previously mentioned, laminated glass, such as a windshield for a vehicle, is commonly constructed of two glass layers and an intermediate layer of tough plastic. When a conventional windshield formed of such laminated glass is struck at a point on its outer surface, a break is usually formed. Such breaks frequently take the form of a bullseye or a star and can initially have small cracks radiating from a point opening on the surface outwardly and downwardly through the outer lamination of the resin interface. Where laminated glass is impacted to form a small bullseye or star without further cracking across the entire pane or windshield, it is conventionally well known that such larger cracks tend to subsequently develop over time, if the initial impact point is not repaired.

When such damage occurs to the windshield, various contaminants including air and moisture may become trapped between the two layers of glass. These contaminants can alter the refractive index of the windshield, thereby obscuring or impeding the vision of a driver. Also these damages will weaken the windshield, compromising the structural integrity of the windshield and its ability to properly support the structure of the vehicle.

Differing methods and devices have been developed over many years which enable such small impact craters and cracks to be repaired and thereby help prevent long cracks from developing across the pane or windshield. Conventionally, a resin is injected into the laminated glass at the impact point. The resin is then cured, and if formed substantially of material with the same light transmission characteristics, will form a repair. This repair will help prevent further cracking and will also repair the optical viewing characteristics of the pane or windshield, substantially, sufficiently, that replacement is unnecessary. As a consequence, many devices are in the prior art which are adapted to the task of injecting resin into small formed cracks of laminated class for the purpose of a repair.

Examples of such conventional prior art include U.S. Pat. Nos. 4,775,305, 5,670,180, and 8,092,203 which are included herein as examples of conventional resin injection systems and devices. The noted prior art devices along with other resin injecting devices available, teach the use of a glass-engageable base, which has a threaded aperture adapted to threadably engage with threads formed on an exterior surface of an injecting component or other modes involving a rotation or jacking of the injecting device or the mount to thereby cause translation of the injecting device to an operative contact against the damaged glass.

In use, the base which supports a conventional injector must first be positioned upon the glass while the user tries to center the threaded aperture over the impact site on the underlying glass. With the base operatively engaged with the glass, and the threaded aperture centered over the small crack, the injector is screwed into and through the threaded aperture until the distal end of the injector contacts the glass.

At this point, the user must view the contact point of the seal and distal end of the injector on the glass, and ascertain if in fact the positioning of the base was correct, and has yielded an alignment of the seal on the injector tip, around the crack. If the initial positioning was incorrect the user must unscrew the injector from the threaded aperture and reposition the base upon the glass to recenter the aperture around the crack. Thereafter, the user will re-engage the threaded exterior of the injector into the threaded aperture and screw the injection in this engagement to move the seal at the distal end of the injector to a contact surrounding the crack on the glass surface. If the user correctly places the mount to cause the correct contact of the seal, with the defect in the glass at the distal end of the injector, then the resin injection and curing can continue. If the placement is incorrect, a replacement will be required until proper placement is achieved to properly position the tip of the injector.

Conventionally, once this centered positioning has been achieved, threading the injector through the base to the contact of the seal and distal end with the glass will move the distal end of the injector toward the glass. The user will continue to screw the injector, or a screw engaged thereto, to move it toward the glass until the user discerns sufficient pressure has been imparted to a seal on the distal end of the injector. This pressured engagement of the seal is required to form a seal around the crack to be repaired with injected resin.

Various prior art devices and system may, or may not, provide a vacuum by manipulating the injector piston by either threading or pulling up and locking the injection piston in relation to the injection housing. In such instances, a laterally projecting plunger member is engaged with the injector piston to provide the threading action or by friction to lock the injector piston into its various positions, either for creating the vacuum to evacuate the air and/or contaminants from the damaged site or creating the pressure to inject the filling material into the void of the damaged site.

However, the prior art devices noted above, as well the other conventional glass repair systems, while functioning to repair small cracks in laminated glass, suffer from significant shortcomings. First, the use of a threaded engagement between the base, and the resin injector, can cause significant delays in the process, since once the base is engaged to the glass, if it is not correctly centered, the user must go through the time consuming process of threading the injector in and out of the base, in-between attempts at centering the aperture in the base.

Second, and more significantly, it was noted above that small impact cracks, known as stars and bullseyes, can be the starting point of large cracks which will communicate across the pane or windshield and render the glass unusable. This process of resin injection and curing is supposed to help prevent that occurrence.

Applying too little pressure from the injection assembly to the glass will result in the inability of maintaining a seal to the glass thus compromising the ability to create and maintain a vacuum on the damaged site. A lack of vacuum results in the inability to evacuate air or other contaminants and also results in the loss of the filling material needed to fill the damaged site.

Applying too much pressure from the injection assembly against the glass will result in closing off the resin injection passageways into the damaged site by collapsing the axial passage of the seal at the distal end. Such incorrect contact of the seal thus contributes to the difficulty or even the inability of injecting the filling material into the damaged area.

Still further, because the prior art uses a threaded engagement of the injector through a threaded aperture in the base, or a similar engagement yielding significant mechanical advantage, the act of moving the injector for tightening the distal end of the injector against the glass, can actually increase damage to the glass by causing a large crack to emanate across the pane or windshield if excess pressure is imparted.

As such, there exists a continuing unmet need for a secure, and easy to employ, mounting system for use in combination with resin injectors used for repairing laminated glass such as windshields. Such a device should provide for easy and quick engagement and disengagement of the resin injecting device, to allow for the proper positioning of the distal end upon the glass for the repair, without the need to tediously screw and unscrew a threaded engagement. Further, such a device should also employ an engagement between the base and the resin injecting device which will allow for a seal needed for resin injection, but which will prevent cracking and glass damage caused by over torquing a threaded engagement in achieving such a seal.

The forgoing examples of related art, as to resin injection systems for repair of laminated glass, and the limitations related therewith, are intended to be illustrative and not exclusive, and they do not imply any limitations on the invention described and claimed herein. Various other limitations in the related art of laminated glass repair will become apparent to those skilled in the art upon a reading and understanding of the specification below and the accompanying drawings.

SUMMARY OF THE INVENTION

The device herein disclosed and described provides a solution to the shortcomings in prior art with regard to the repair of damaged laminated glass through the provision of a glass-engageable mount, which is configured to form a sliding ratcheted engagement with an exterior surface of a housing of a resin injector, to position a seal at the distal end of the resin injector, in operative sealed engagement against the glass.

The device features a mount body having an aperture communicating between a first surface and second surface of the mount body. The second surface of the mount is configured for a removable fixed engagement with the glass to be repaired. In a preferred mode achieving this fixed engagement, extending from a connection with the second surface of the body of the mount, are one or preferably a plurality of suction cups which are operatively positionable to a suctioned engagement against the glass.

With the body of the mount removably engaged to a fixed position with the glass, in a location positioning the aperture in the body operatively aligned with an opening to the defect formed in the laminated glass, the housing of the resin injector is slidably engaged with a surface having a plurality of recesses formed therein facing a side of the aperture having a pivoting pawl located therein. The pivoting pawl is biased by a biasing component, such as a spring, to rotate in a first direction to a first position causing sequential engagement of a connecting surface on the pawl, with each sequential recess formed into the exterior of the housing of the injector. The sequential recesses in the surface of the housing of the injector, may be described as teeth for convenience herein, but such should not be considered narrowing. Further, the sequential recesses in the exterior surface of the injector are shown as positioned on a planar section thereof, however they may be positioned on any area of the exterior surface of the injector, which will operatively align with the pawl, when the injector is translated into and through the aperture in the body of the mount.

The biased positioning of the pawl, causes a default engagement of a connective surface of the pawl with each recess formed into the exterior of the housing, as a user slides the housing through the aperture from the first side of the body of the mount, toward the glass. With each successive engagement of the connective surface of the pawl with the next successive recess, a seal located at the distal end of the injector, comes closer to the surface of the glass, until it contacts the glass surface.

Upon contact of the seal with the glass surface, the user, by translating the housing further toward the glass surface, will compress the seal in its contact against the glass surface to a compressive engagement. This compressive engagement is maintained by the engagement of the connective surface of the pawl with a recess in the housing and can be increased by translating toward the next consecutive engagement of pawl and recess.

Release of the biased pawl with the engagement to a recess is achieved by depressing a proximal end which overcomes the bias and disengages the connective surface of the pawl, allowing easy removal reversal of the housing from the body of the mount. This easy engagement and easy release, provided by the pawl and housing engagement, provides for a significant increase in productivity by reducing the amount of time required to both properly engage the housing of the injector with the glass and disengage it.

Further, by employing a seal having a shape adapted to deform when pressured by the force of the housing, a significantly better seal is achieved for pulling debris and material from the crack through negative pressure, as well as injecting the resin to the crack. Still further, the risk of the user cracking the class by over pressure of the injector against the glass is significantly reduced since mechanical advantage of threaded connections between the body of the mount and the housing are eliminated and the durometer and shape of the seal will cause deformation of the seal by simple translation by hand of the housing toward the glass.

With respect to the above description, before explaining at least one preferred embodiment of the herein disclosed invention in detail, it is to be understood that the glass repair tool and mounting system is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed glass repair device and ratcheted mounting system. It is important, therefore, that the claims be regarded as including such equivalent construction and methodology insofar as they do not depart from the spirit and scope of the present invention.

The objects features, and advantages of the present invention, as well as the advantages thereof over existing prior art, which will become apparent from the description to follow, are accomplished by the improvements described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive examples of embodiments and/or features. It is intended that the embodiments and figures herein are to be considered illustrative of the glass repair mounting system herein, rather than limiting.
In the drawings.

Figure 1:
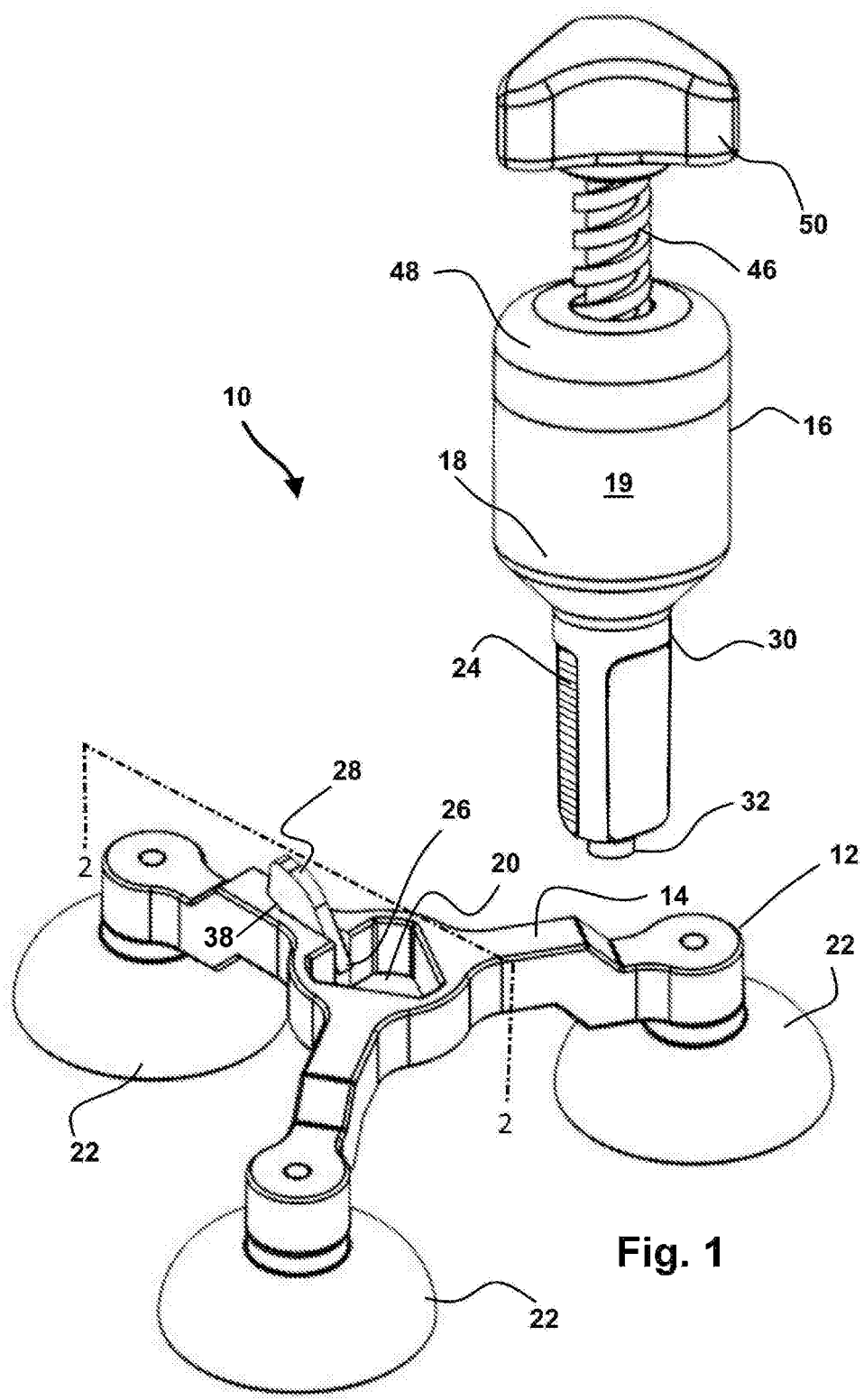
FIG. 1 depicts a mode of the device showing the mount adapted for sliding ratcheted engagement with an injector in an exploded view.

Other aspects of the present invention shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Now referring to drawings in FIGS. 1-7, wherein similar components are identified by like reference numerals, there can be seen in FIG. 1 the device showing the glass repair device 10 having a mount 12 which is configured to removably engage to a fixed position upon the surface of glass being repaired. Providing particular utility, due to the shown and described sliding ratcheted engagement of the body 14 of the mount 12 with an injector 16, significantly reduces the time needed to operatively engage and disengage the injector 16 in operative contact with the glass, by providing for a sliding ratcheted engagement of the exterior surface of the housing 18 of the injector 16, through an opening through or engaged with the body 14 of the mount 12. By sliding ratcheted engagement is meant that the housing of an injector 16, is in a sliding engagement with the body of a mount 12, such that the injector 16 will slide under force in a first direction, toward the glass 13 to which the body 14 of the mount 12 is removably engaged by a connector, and is held in any of a plurality of positions along the line of sliding in the first direction by a releasable engagement between the injector 16 and body 1, and the injector 16 will not slide in a second direction opposite the first direction unless the releasable engagement is disengaged.

Thus, the disclosed mount 12, in a sliding ratcheted engagement with any injector 16, provides a significant increase in utility and function, when paired with any resin injector 16 which is used to communicate curable resin into the crack or defect in the underlying glass 13. While shown as a sliding engagement through an opening communicating through the mount 12 which works best after much experimentation has shown it provides a more even compression, the sliding ratcheted engagement could also be through achieved through an opening connected to an exterior edge of a mount 14, and such is anticipated within the scope of this invention.

As shown in FIG. 1, and as is common to all modes of the mount 12 herein, an opening 20 is engaged with or communicates through the body 14 of the mount 12 from a first side to a second side of the body 14. On the second side of the mount 12 is situated a removable connector to engage the mount 12 to a fixed but removable position on the glass 13.

Currently, as shown in the various configurations of a mount 12 shown herein, at least one and preferably a plurality of suction cups 22 extending from a second side of the body of the mount 12, are employed as the removable connector to the underlying glass, which while engaged, will hold the mount 12 in a fixed operative position thereon, once so determined. The suction cups 22 are formed of a pliable elastic material such as silicone, or a polymeric material, or the like, which is elastic. The elastic material imparts a sealing to the suction cups 22 to form a releasable suctioned engagement with the glass 13. Further, and particularly preferred, the elastic material forming the one or more suction cups 22, will stretch upon contact of the first end of the injector 16 against the glass 13. This stretching imparts a movement of the body 14 of the mount 12, in the second direction, opposite the first direction of sliding of the injector 16 toward the glass 13. This movement of the body 14 of the mount 12, in the second or opposite direction of sliding of the injector 16, thereby forms a release from excess pressure of the contact of the first end of the injector 16 with the glass 13, to prevent damage to the glass 13 from an over-pressure contact. Currently, forming the suction cups from an elastic material such as one or a combination of elastic materials from a group including nitrile, silicone, neoprene, and polyurethane, having a durometer between 30 to 65 shore, has shown to provide the desirable stretching during such a contact, to release such an over pressure condition.

However, the removably engageable connector should not be limited to suction cups 22 alone, and any removably engageable connector which will removably attach to a glass 13 surface, and hold the mount 12 secure in a fixed position, may be employed as would occur to those skilled in the art, for example a non curing adhesive or a re-adherable area of glue such as those manufactured by 3M corporation, which will hold a position and allow for compression of a seal, but is removable.

As can also be seen in the exploded view of FIG. 1, the mount 12 is configured to engage in a sliding ratcheted engagement with an injector 16. What is meant by a sliding ratcheted engagement is a sliding of the injector to a fixed but temporary positioning vertically, with an engagement between a connective surface 26 projecting from disengageable pawl 28, and the aligned recesses 24 formed into the exterior surface 19 of the housing 18 of the injector 16. Other sliding ratcheted configurations of recesses and projections may be employed, but experimentation has shown the current connective surface 26 projecting from a pivotable pawl 28, engaging aligned recesses 24 formed into the exterior surface 19 of the housing 18, to work particularly well to hold the vertical position of the housing 18, in a chosen vertical positioning relative to the underlying glass and mount 12 temporarily affixed thereto. Such allows for translation of the housing 18, toward the underlying glass 13, to a position where the pawl 28 engages one of the sequential recesses 24 to form an operative compressive contact of the annular seal 32 against the glass 13, which is maintained until the pawl 28 is released by pivoting or sliding, so it disengages from the individual recess 24 within the series of recesses 24 formed into a surface of the housing 18.

An injector, thus, configured with a portion of the exterior surface 19 thereof having sequentially located substantially parallel recesses 24 formed therein, which naturally form ridges therebetween in an aligned teeth-like formation, and having a section 30 of a first end or leading end of the injector 16 formed in a shape complimentary to that of the opening 20, will engage with the mount 12 in this sliding ratcheted engagement.

In all modes of the device 10 herein, the pawl 28 is in a releasable engagement such as a sliding or pivoting engagement to the body 14 of the mount 12. A connective surface 26 of the pawl 28 communicates slightly into the opening a distance sufficient to operatively engage with any of the recesses 24 formed into the exterior surface 19 of the housing 18 of the injector 16.

The pawl 28 is biased to rotate the connective surface 26 shown as a point, to engage the recesses 24 and prevent translation of the housing 16 in a second direction away from the surface of the glass 13, unless disengaged by the user. However, this sliding ratcheted engagement is configured such that translation of the housing 16 in a first direction, toward the glass 13, will cause the connective surface 26 of the pawl 28 to momentarily slip, and allow unencumbered translation of the housing 16 in a first direction toward the glass 13 as the pawl 28 engages each of the sequentially positioned recesses.

Figure 7:
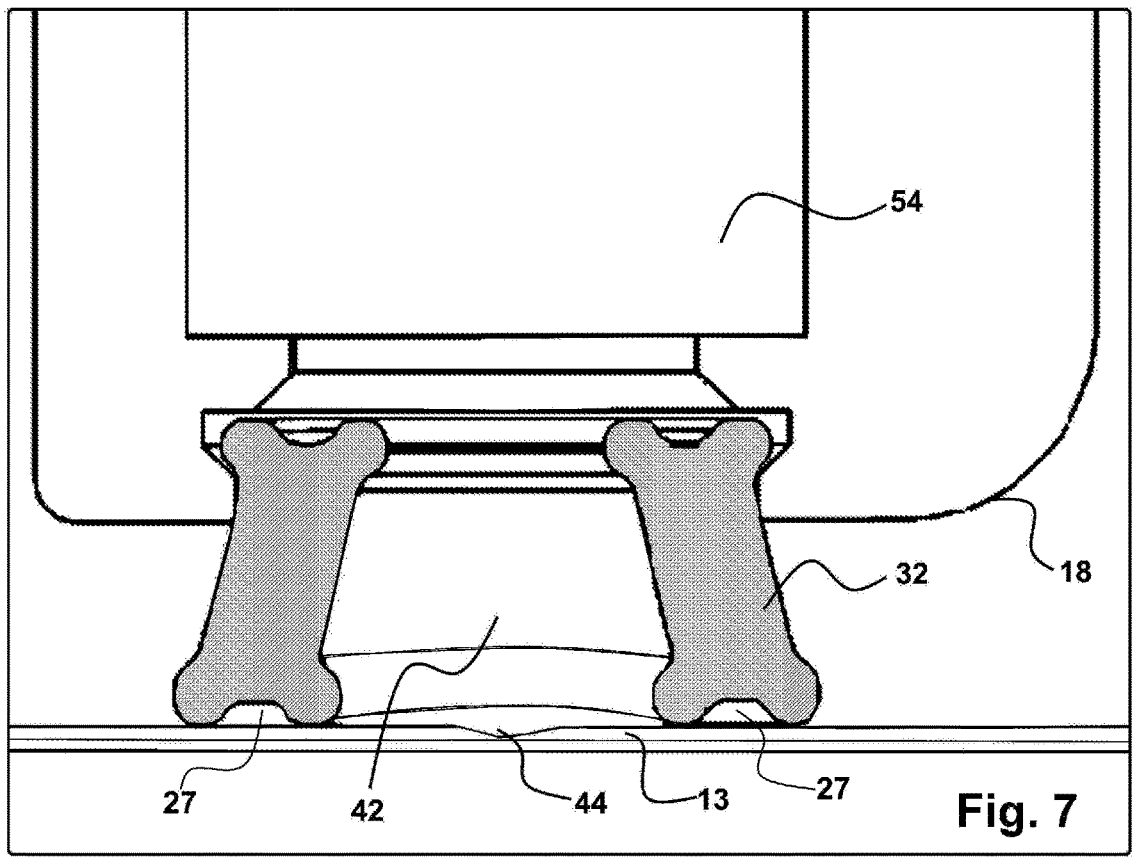
FIG. 7 depicts the compression deformation of the seal located at the distal end of the injector, which occurs during translation of the housing in the ratcheted engagement and which is held by the pawl engagement with the recesses in the housing of the injector during use.

Thus, a user employing the sliding ratcheted engagement can easily slide and translate the housing 16 toward the glass 13 until an annular seal 32 contacts the class. A successive sliding of the hosing 16 toward the glass 13 after contact by the seal 32 will cause a compressive engagement of the seal 32 between the glass surface and the distal end of the injector 16 (FIG. 7). This compressive engagement is held in place by the seating of the connective surface 26 of the pawl 28 into one of the successive recesses 24 formed along a line on the exterior surface 19 of the injector 16. Adjusting the durometer of the seal 32, allows for a predictive compression resistance, as a safety to prevent excessive pressure against the glass 13 which could cause cracking.

Currently, forming the seal 32 in a material with a durometer between 50-100 shore is particularly preferred to provide an excellent air tight seal, yet also compress to form another release from excess pressure of the first end of the injector 16 against the glass 13 and prevent cracking of the underlying glass 13. This durometer has also been found to deform slightly at the contact point with the glass 13 to form a frusto conical chamber (see FIG. 7) which is slightly wider on the glass side of the seal 32 which is particularly useful when trying to surround the crack or chip or deformity in the glass 13. Thus, forming the annular seal 32 from material such as silicone, or other compressible compound suitable to resist resin with a durometer in the noted range is preferred upon injectors 16 which are in a sliding ratcheted engagement with the base 12. When employed in combination with the above noted stretchable material for the suction cups 22 a first and a second release from excess pressure of the contact of the first end of the injector 16 can be provided which is especially preferred.

Figure 1A:
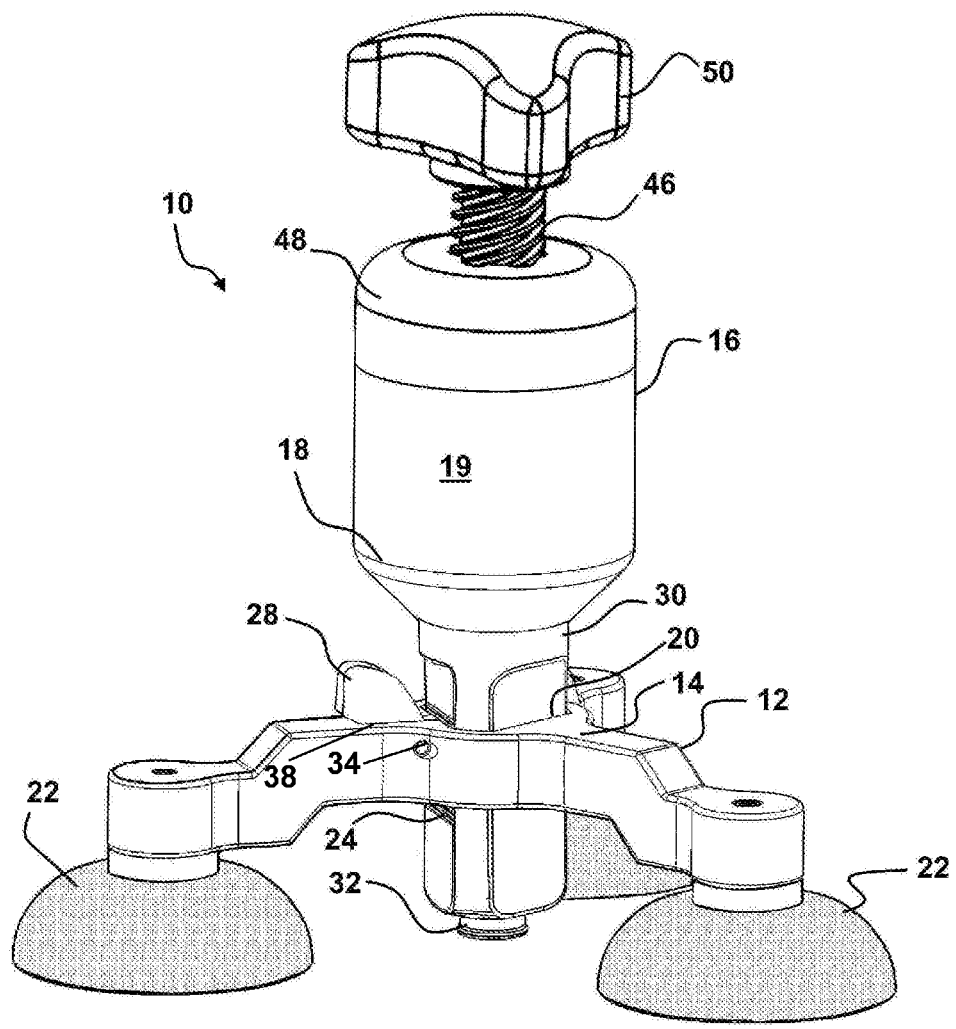
FIG. 1a depicts the device as shown in FIG. 1, showing the injector in an engaged position translated to communicate through the opening formed in the body of the mount.

As noted, FIG. 1a depicts the device 10 as shown in FIG. 1 showing the injector 16 in the sliding ratcheted engagement with the base 12. In the depicted engagement, a section 30 of the housing 16 shaped complimentary to the shape of the opening 20, but just slightly smaller in circumference, is engaged to communicate through the opening 20 in the body 14 of the mount 12. This ratcheted engagement allows sliding of the housing 16 in the first direction running from the first side of the body to the second side of the body on which the suction cups 22 are positioned. The ratcheted engagement prevents translation of the housing 16 in a second or opposite direction, away from the glass 13 and cups 22, unless or until the pawl 28 is disengaged by the user to disengage the connective surface 26 from the recesses 24 in the housing exterior surface.

In use, in all modes of the mount 12 shown herein, the mount 12 is operatively engaged to the glass 13 using flexible suction cups 22 extending from the second side of the body 14 of the mount 12. With a mount 12 so engaged, an injector 16, having a section 30 shaped complimentary to a shape of the opening 20, but having a circumference slightly smaller, is placed in the sliding ratcheted engagement with the mount 12. This is accomplished by simply inserting the section 30 of the injector 16 into the opening 20 where the sliding ratcheted engagement between the connective surface 26 of the pawl 28 with successive parallel recesses 24 formed in the exterior surface 19 of the housing 18 of the injector 16, until the seal 23 contacts the glass 13 (FIG. 7). The seal 32 can then be compressed slightly by sliding the housing 16 such that the next successive recess 24 engages the pawl 28. Compression can be increased by repeating this process and allowing the pawl 28 to engage successive recesses 24.

Figure 2:
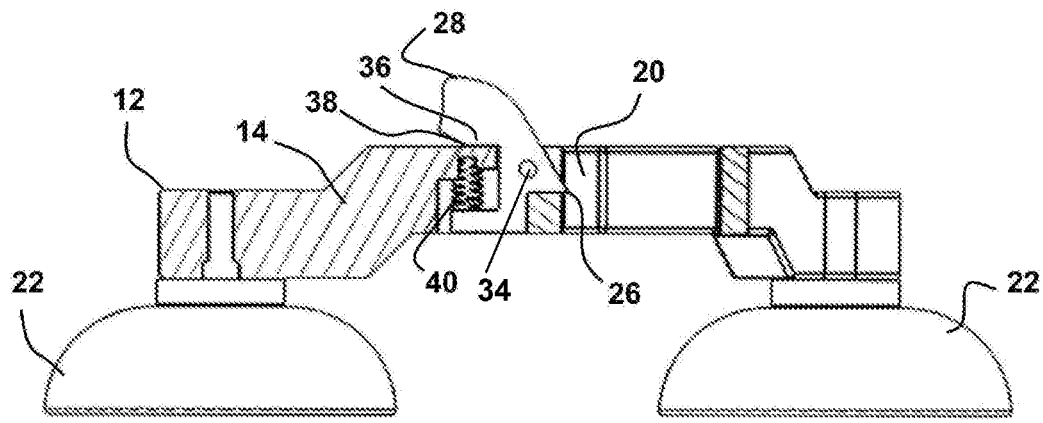
FIG. 2 is a sectional view through the mount of FIG. 2 showing the pawl common to all modes of the mount, which is biased to engage a connective surface in the recesses formed into the housing of the injector.

FIG. 2 is a sectional view through the mount of FIG. 2 showing the pawl 28 operatively engaged within a recess in the body 14 of the mount 12, which is common to all modes of the mount 12. The pawl 28 is biased to rotate the pawl 28 on a pivot 34 such that a contact area 36 on the pawl 28 contacts against a stop 38 on the body 14 of the mount 12. This maintains the connective surface 26 of the pawl 28 engaged in a recess 24 on the housing 18. The user may release the pawl 28, such as by sliding it or by rotating it on the pivot 34 in a direction to compress the biasing component shown as the spring.

Figure 3:
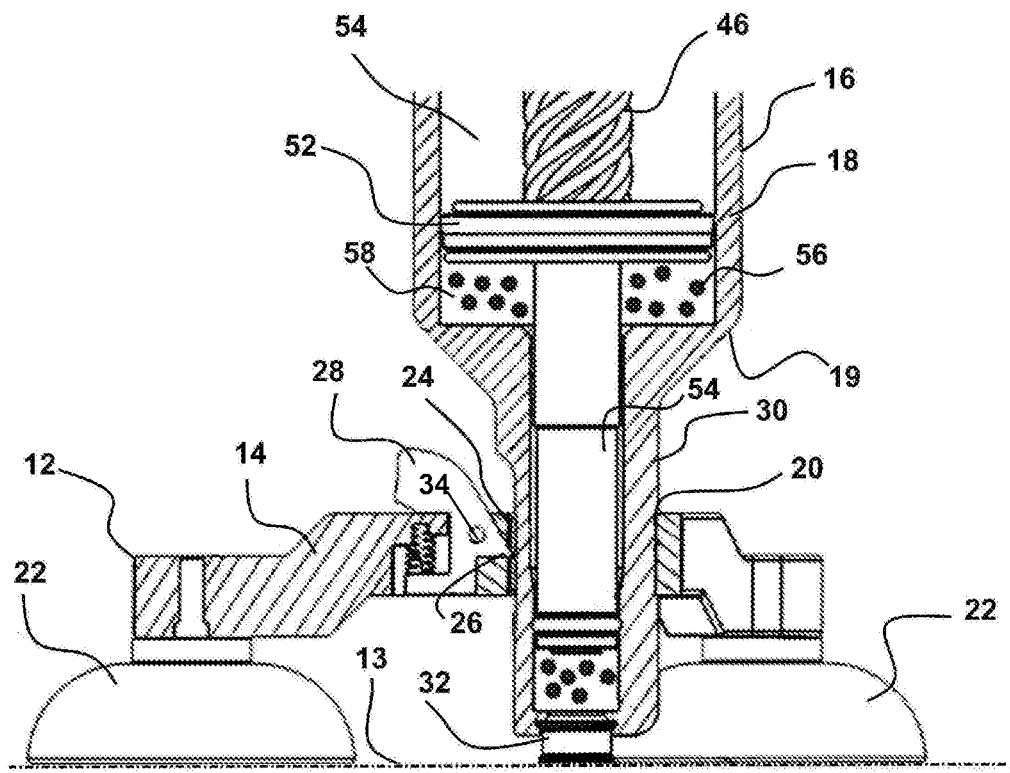
FIG. 3 shows a sectional view of a typical biased pawl employed to engage a connective surface with the recesses or teeth on the exterior of an injector, such as through FIG. 3.

FIG. 3 shows a sectional view through the device 10 showing an injector 16 operatively engaged with the body 14 of the mount 12 in a manner typical of all modes of the device herein. In the depicted view, an injector 16 is in a sliding ratcheted engagement within the opening 20, and the mount 12 is operatively engaged to the glass 13 such as a windshield.

As can be seen in FIG. 3, the mount is operatively engaged with the laminated glass 13 over and in proximity to a damage site using means for engagement to the glass 13 such as suction cups 22. The seal 32 at the distal end of the injector 16 is held in a compressive sealed engagement with the glass 13, such as shown in FIG. 7. The frusto conical chamber 42 surrounds the damaged portion 44 on the glass 13 and is held in this compressive sealed engagement, by the injector 16 having the section 30 communicating through the opening 20 in the body 14 of the mount 12, such that one of the recesses 24 operatively engages with the connective surface 26 of the pawl 24. Tension imparted by a spring 40 or other means to bias the pawl 24, holds the connective surface 26 of the pawl 24 in the engagement with the recess 24, unless released by the user through a rotation of the pawl 24 in a direction against the bias of the spring 40, out of this engagement. As can be seen, the injector 16, can be easily translated through the opening 20 in the body 14 of the mount 12, and positioned in the sealed engagement with the glass 13, which positions the chamber 42 to surround the damage 44, and much more quickly than a threaded rotational engagement.

Operation of an injector 16, when in operative sliding ratcheted engagement with the mount 12 can be discerned in the views of FIG. 1a and FIG. 3. The threaded upper piston 46 may employ a multiple start helical coil thread which may have a single pitch or a variable pitch. These threads may correspond with matching threads in the central part of the cap 48 at the first end of the injector 16. A handle 50 attached to the upper piston 46, when rotated, causes the upper piston 46 to rotate in the cap aperture in the cap 48 imparting lateral movement of the piston assembly 52 within an axial passage 54 within the injector housing 18.

This lateral action of the piston assembly 52 in the injector housing 18 in a first direction creates the vacuum in the chamber 42 (FIG. 7) which can remove any contaminants such as air from the damage portion 44 of the glass 13. The lateral action, in a direction toward the glass 13, causes an injection of the repair fluid 56 from the resin chamber 58 into the damaged portion 44 of laminated glass 13.

Figure 4:
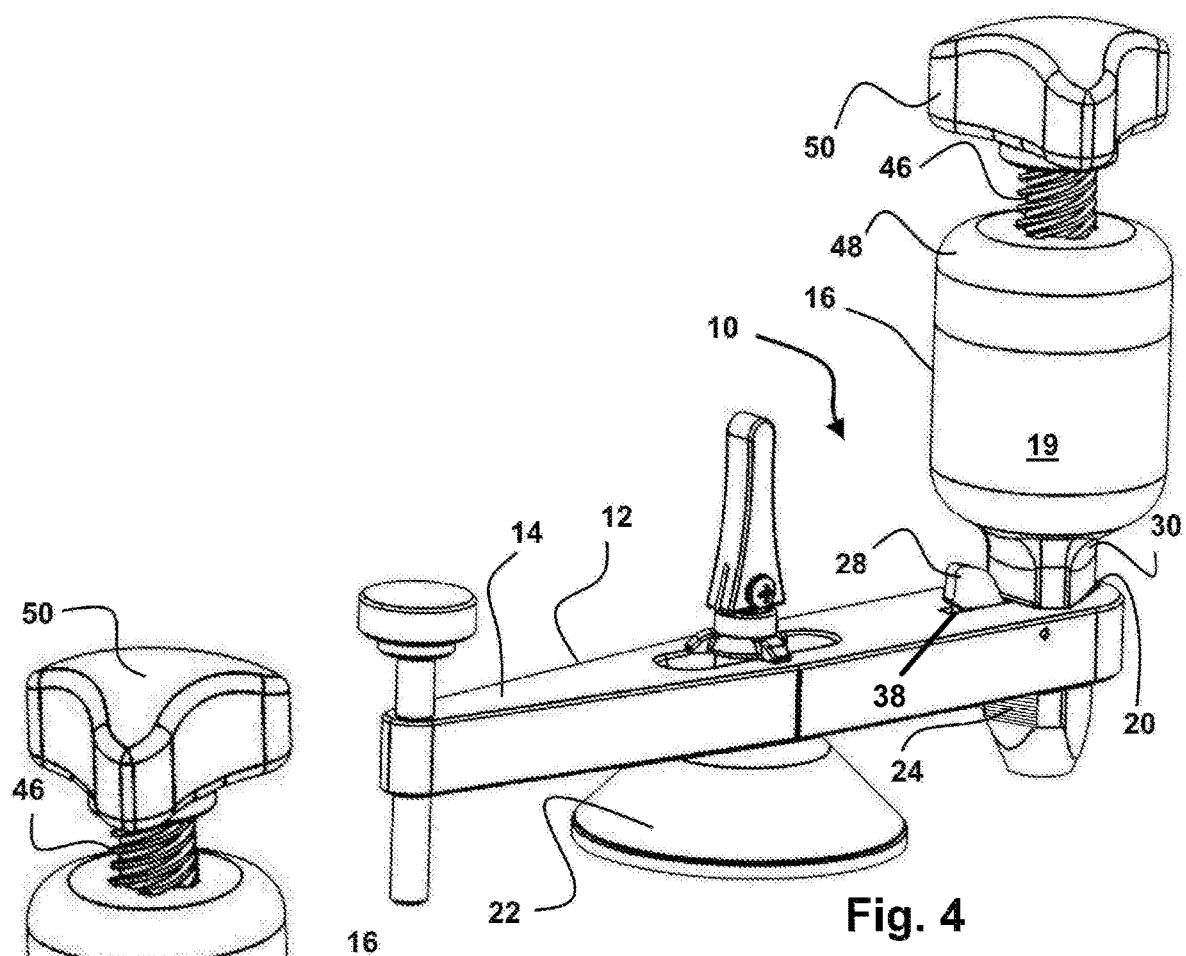
FIG. 4 shows another configuration of a mount engageable to the glass surface and depicting the sliding ratcheted engagement between the housing of the injector with the pawl operatively positioned adjacent the opening in the body.

FIG. 4 shows another configuration of a mount 12 having a body 14 which is adapted for engagement to the glass 13 using a single suction cup 22 or other removable mount. Also shown is the sliding ratcheted engagement between the recesses 24 formed like teeth in the exterior surface 19 of the housing 18 of the injector 16 with the pawl 28 operatively positioned adjacent and extending into the opening 20 in the body 14 of the mount 12.

Figure 5:
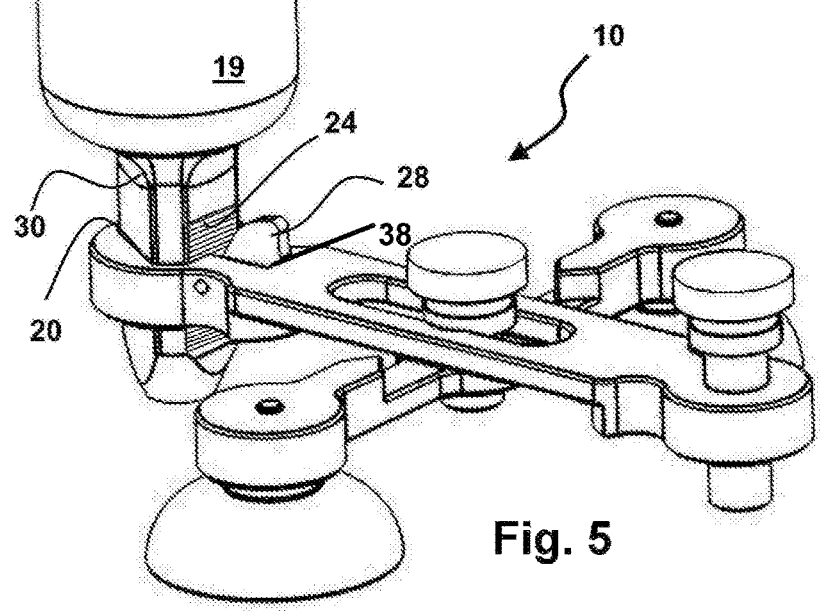
FIG. 5 shows another configuration of the body of a mount which is engageable to the glass being repaired, and showing the sliding ratcheted engagement between an injector, and the body of the mount.

FIG. 5 shows yet another configuration of a mount 12 having a body 14 which is configured for removable engagement to the glass 13 with less than a plurality of cups 22. The injector 16 is shown in the sliding ratcheted engagement with the opening 20 communicating through the body 14 of the mount 12.

Figure 6:
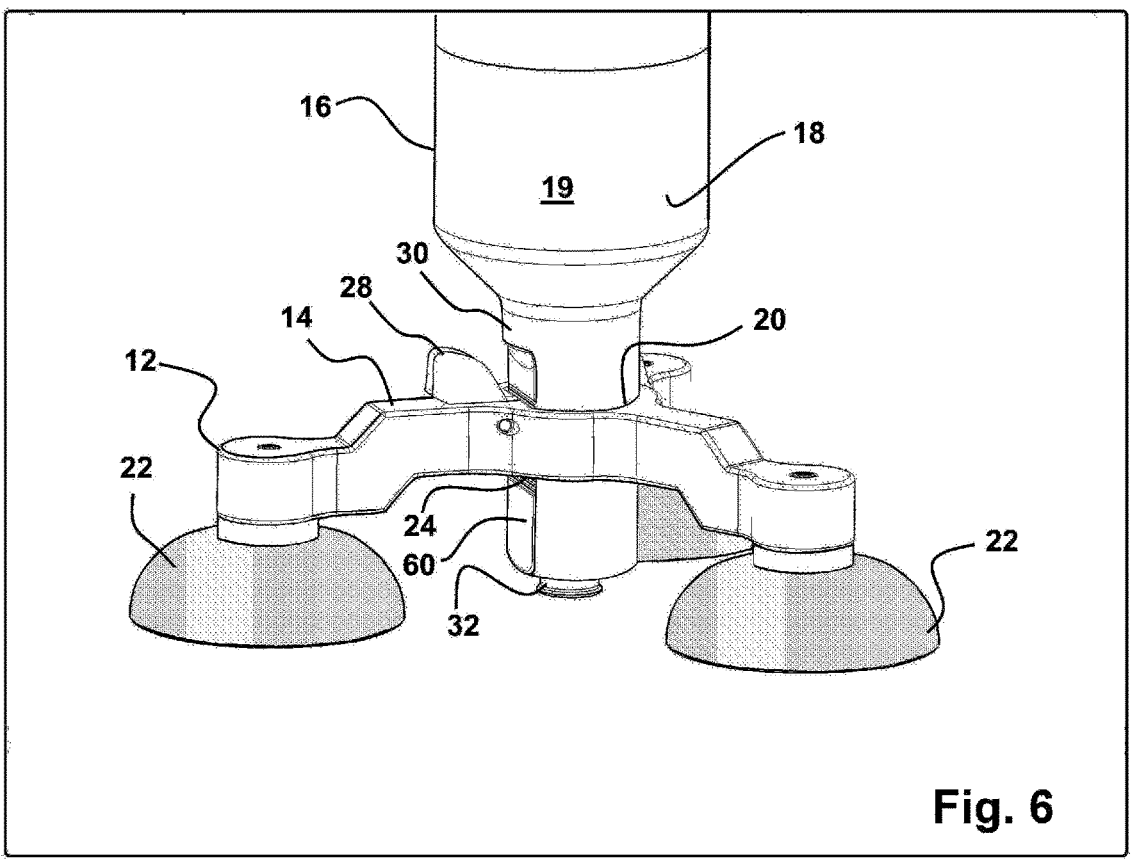
FIG. 6 shows an enlarged depiction of the sliding ratcheted engagement between a mount and the exterior of the injector housing, and showing the shape of the aperture being round but for one planar side to hold the housing from rotating.

FIG. 6 shows an enlarged depiction of the sliding ratcheted engagement between an operatively biased pawl 28 adjacent the opening 20 in the body 14 of the mount 12 and the recesses 24 in the exterior surface 19 of the injector 16. As can be seen, while the engagement section 30 has a shape that is complimentary but slightly smaller than the shape of the circumference of the opening 20, it need not have multiple planar sides, and in fact will function with no planner sides. It is preferred that at least one planar portion 60 be formed on the exterior surface 19 of the housing 18 of the injector 16 as a means to prevent rotation of the injector 16, when operatively engaged in the sliding ratcheted engagement through the opening 20.

FIG. 7 depicts the compression deformation of the seal 34 located at the distal end of the injector 16 and forming the chamber 42. As noted this deformation occurs during translation of the injector 16 in the sliding ratcheted engagement with the mount 12. As also noted, this deformation is preferable as it provides a means to prevent excess pressure from communicating to the glass 13 which might cause additional cracking, and forms a frusto conical chamber 42 which forms a wider end to surround the damaged portion 44 during use.

While all of the fundamental characteristics and features of the mount and glass repair invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A glass repair tool, comprising:
 a mount having a body, said body having a first side opposite a second side;
 a removably engageable connector engaged with said body of said mount, said removably engageable connector configured to engage to a glass surface and hold said mount in a fixed position;

said body having an opening;

a resin injector having a housing, said housing having a first end opposite a second end, said housing having an exterior surface;

an annular seal formed of compressible material positioned at said first end of said resin injector, said annular seal engaged at a first end of said annular seal to said resin injector and extending to a distal end of said annular seal;

said exterior surface of said housing in a sliding ratcheted engagement with said opening; and said distal end of said annular seal at positionable to a contact with said glass by a sliding of said housing engaged in said sliding ratcheted engagement in a first direction toward said glass while said connector is removably engaged with said glass, said housing prevented from movement in a second direction opposite said first direction while in said sliding ratcheted engagement;

said contact of said distal end of said annular seal with said glass forming a chamber, said chamber extending within an interior wall of said annular seal from first end of said chamber at said contact of said distal end of said annular seal with said glass, toward a second end of said chamber at said first end of said annular seal; and said resin injector actuable to inject resin into said chamber and to a pressurized communication thereof into a damaged portion of said glass at said first end of said chamber.

2. The glass repair tool of claim 1, wherein said sliding ratcheted engagement comprises:

said exterior surface of said housing having a first planar surface;

a plurality of recesses formed into a first planar surface formed on said exterior surface of said housing;

a pawl in a movable connection with said body of said mount, said pawl having a contact area projecting into said opening;

said contact area shaped for an engagement within each of said plurality of recesses;

said sliding of said housing in said first direction, successively releasing and re-engaging said contact area with successive individual recesses in said plurality of recesses;

said engagement of said contact area of said pawl with any of said recesses preventing said movement of said housing in said second direction;

said opening in said body having a planar side in a sliding contact against said first planar surface on said exterior of said housing; and said sliding contact of said planar side against said first planar surface preventing rotation of said housing of said resin injector when engaged within said opening.

3. The glass repair tool of claim 2 additionally comprising:

said chamber tapering from a widest portion at said first end of said chamber at said contact of said distal end of said annular seal with said glass, to narrowest narrowest portion of said chamber at said second end of said chamber.

4. The glass repair tool of claim 3, wherein a biasing component imparts force to said pawl in said movable connection, said contact area being held in a compressive contact with each of said plurality of recesses and thereby preventing said movement in said second direction, by said force.

5. The glass repair tool of claim 4 wherein said biasing component is a spring and said movable connection of said pawl with said body is a pivoting engagement therewith.

6. The glass repair tool of claim 3 wherein said removably engageable connector is at least one suction cup extending from a connection with said second side of said body of said mount.

7. The glass repair tool of claim 6 additionally comprising:

an annular recess formed into said distal end of said annular seal; and said contact of said distal end of said annular seal with said glass being formed by two annular surfaces of said distal end of said annular seal on opposing sides of a gap therebetween defined by said annular recess.

8. The glass repair tool of claim 6 additionally comprising:

said annular seal formed of said compressible material having a shore hardness between 50-100;

said at least one suction cup formed of said elastic material having a shore hardness between 30-65; and said respective shore hardness of said annular seal and said suction cup allowing a deflection of one or both of said annular seal and said suction cup during said contact of said distal end of said annular seal with said glass defining a release from excess pressure during said contact to prevent cracking of said glass.

9. The glass repair tool of claim 3 additionally comprising:

an annular recess formed into said distal end of said annular seal; and said contact of said distal end of said annular seal with said glass being formed by two annular surfaces of said distal end of said annular seal on opposing sides of a gap therebetween defined by said annular recess.

10. The glass repair tool of claim 2, wherein a biasing component imparts force to said pawl in said movable connection, said contact area being held in a compressive contact with each of said plurality of recesses and thereby preventing said movement in said second direction, by said force.

11. The glass repair tool of claim 10 wherein said biasing component is a spring and said movable connection of said pawl with said body is a pivoting engagement therewith.

12. The glass repair tool of claim 2 wherein said removably engageable connector is at least one suction cup extending from a connection with said second side of said body of said mount.

13. The glass repair tool of claim 2 additionally comprising:

an annular recess formed into said distal end of said annular seal; and said contact of said distal end of said annular seal with said glass being formed by two annular surfaces of said distal end of said annular seal on opposing sides of a gap therebetween defined by said annular recess.

14. The glass repair tool of claim 1, additionally comprising:

said chamber tapering from a widest portion at said first end of said chamber at said contact of said distal end of said annular seal with said glass, to narrowest narrowest portion of said chamber at said second end of said chamber.

15. The glass repair tool of claim 14 wherein said removably engageable connector is at least one suction cup extending from a connection with said second side of said body of said mount.

16. The glass repair tool of claim 14 additionally comprising:
- an annular recess formed into said distal end of said annular seal; and
- said contact of said distal end of said annular seal with said glass being formed by two annular surfaces of said distal end of said annular seal on opposing sides of a gap therebetween defined by said annular recess.

17. The glass repair tool of claim 1 wherein said removably engageable connector is at least one suction cup extending from a connection with said second side of said body of said mount.

18. The glass repair tool of claim 1 additionally comprising:
- an annular recess formed into said distal end of said annular seal; and
- said contact of said distal end of said annular seal with said glass being formed by two annular surfaces of said distal end of said annular seal on opposing sides of a gap therebetween defined by said annular recess.

* * * * *